(12) United States Patent
Hellenbrand (10) Patent No.: US 11,427,407 B2
(45) Date of Patent: Aug. 30, 2022

(54) APPARATUS AND METHOD FOR IDENTIFYING, MEASURING AND POSITIONING PIECE GOODS

(71) Applicant: Becton Dickinson Rowa Germany GmbH, Kelberg (DE)

(72) Inventor: Christoph Hellenbrand, Kaifenheim (DE)

(73) Assignee: BECTON DICKINSON ROWA GERMANY GMBH, Kelberg (DE)

( * ) Notice: Subject to any disclaimer, the term of this patent is extended or adjusted under 35 U.S.C. 154(b) by 167 days.

(21) Appl. No.: 16/751,559

(22) Filed: Jan. 24, 2020

(65) Prior Publication Data

US 2021/0229926 A1 Jul. 29, 2021

(51) Int. Cl.
| | |
|---|---|
| B65G 43/08 | (2006.01) |
| B65G 57/04 | (2006.01) |
| B65G 61/00 | (2006.01) |

(52) U.S. Cl.
CPC ............ *B65G 43/08* (2013.01); *B65G 57/04* (2013.01); *B65G 61/00* (2013.01); *B65G 2203/0216* (2013.01); *B65G 2203/041* (2013.01)

(58) Field of Classification Search
CPC combination set(s) only.
See application file for complete search history.

(56) References Cited

U.S. PATENT DOCUMENTS 5,921,375 A * 7/1999 van Laar .............. B65G 47/848
198/468.4
9,272,421 B2 * 3/2016 Subotincic ............. B25J 9/1697
9,486,926 B2 * 11/2016 Kawano .................. B65G 43/08
(Continued)

FOREIGN PATENT DOCUMENTS

| | | |
|---|---|---|
| DE | 4318341 A1 | 10/1994 |
| EP | 1748004 A1 | 1/2007 |

(Continued)

OTHER PUBLICATIONS

Extended European Search Report for Application No. 20153597.8, dated Jul. 10, 2020, 14 pages.

*Primary Examiner* — Kyle O Logan
(74) *Attorney, Agent, or Firm* — Morgan, Lewis & Bockius LLP (57) ABSTRACT

Apparatus for identifying, measuring and positioning piece goods with an increased throughput of piece goods are provided. An apparatus includes an optically transparent turntable having a support surface for piece goods which support surface extends in an X and Y direction of the apparatus, a first conveying device for arranging a piece good on the support surface of the turntable, a first optical reading device arranged below the turntable for detecting the dimensions of a piece good and an identifier, a second optical reading device for detecting the height of a piece good resting on the support surface and an identifier, a storage area for a plurality of piece goods which storage area is arranged downstream of the turntable, a second conveying device with a gripping device for piece goods, wherein the gripping device is movable over the storage area, at least in an X and Y direction, in such a way that piece goods can be arranged side by side in the storage area in the X and/or Y direction. Methods for identifying, measuring and positioning piece goods are also provided.

20 Claims, 6 Drawing Sheets

(56) References Cited

U.S. PATENT DOCUMENTS

| | | | | |
|---|---|---|---|---|
| 9,498,798 | B2* | 11/2016 | Hellenbrand | B07C 5/00 |
| 9,807,373 | B1* | 10/2017 | Bruce | H04N 13/282 |
| 9,934,414 | B1* | 4/2018 | Lee | G06K 7/10336 |
| 10,023,396 | B2* | 7/2018 | Hellenbrand | B65G 47/917 |
| 10,611,037 | B1* | 4/2020 | Polido | B25J 15/0061 |
| 2001/0005204 | A1* | 6/2001 | Matsumoto | G06T 15/10 |
| | | | | 345/418 |
| 2004/0094979 | A1* | 5/2004 | Damhuis | B25J 15/0616 |
| | | | | 294/65 |
| 2006/0112023 | A1* | 5/2006 | Horhann | G01G 19/4148 |
| | | | | 33/1 V |
| 2016/0207072 | A1* | 7/2016 | Hellenbrand | B65G 37/00 |
| 2017/0203865 | A1* | 7/2017 | Kalany | B65B 5/105 |
| 2017/0265392 | A1* | 9/2017 | Van De Vegte | A01G 18/70 |
| 2018/0111268 | A1* | 4/2018 | Atohira | B25J 9/1671 |
| 2018/0208410 | A1* | 7/2018 | Mattern | B25J 9/0096 |
| 2019/0031452 | A1* | 1/2019 | Koga | B65G 47/905 |
| 2020/0064255 | A1* | 2/2020 | Boss | G01N 35/0099 |
| 2021/0090143 | A1* | 3/2021 | Chalkley | H04N 5/247 |
| 2021/0375001 | A1* | 12/2021 | Erdei | H04N 17/002 |
| 2022/0088742 | A1* | 3/2022 | Yamamoto | B24B 19/02 |

FOREIGN PATENT DOCUMENTS

| | | |
|---|---|---|
| EP | 2194008 A2 | 6/2010 |
| EP | 3006379 A2 | 4/2016 |

* cited by examiner

APPARATUS AND METHOD FOR IDENTIFYING, MEASURING AND POSITIONING PIECE GOODS

BACKGROUND

The present disclosure relates to an apparatus and a method for identifying, measuring and positioning piece goods, in particular pharmaceutical packages.

SUMMARY

One or more embodiments provide an apparatus for identifying, measuring and positioning piece goods. The apparatus includes an optically transparent turntable having a support surface for piece goods extending in an X and Y direction of the apparatus, wherein the turntable cooperates with a rotary drive coupled to a control device and is rotatable about an axis of rotation extending in a Z direction extending orthogonally to the X and Y directions, and wherein the X direction corresponds to a longitudinal axis and the Y direction corresponds to a transverse axis of the apparatus. The apparatus also includes a first conveying device for arranging a piece good on the support surface of the turntable and a first optical reading device arranged in the Z direction below the turntable and coupled to the control device for detecting dimensions of a piece good resting on the support surface and an identifier on one side surface of a resting piece good, which side surface faces the support surface. The apparatus further includes a second optical reading device coupled to the control device for detecting a height of a piece good resting on the support surface and an identifier on a side surface of a resting piece good which side surface is orthogonal to the support surface. The apparatus also includes a storage area arranged downstream of the turntable for a plurality of packaged goods, wherein the arrangement of the turntable and of the storage area defines the longitudinal axis. The apparatus further includes a second conveying device coupled to the control device and having a gripping device for piece goods, wherein the gripping device is movable, at least in the X and Y directions, over the storage area, so that piece goods can be arranged side by side in the storage area in any of the X and Y directions.

One or more embodiments provide a method for identifying, measuring and positioning piece goods. The method includes a) arranging, with a first conveying device, a single piece good on a first side surface on a support surface of an optically transparent turntable, the support surface extending in an X and Y direction, wherein the turntable cooperates with a rotary drive coupled to a control device, and which turntable is rotatable about an axis of rotation extending in a Z direction extending orthogonally to the X and Y directions, and wherein the X direction corresponds to a longitudinal axis and the Y direction corresponds to a transverse axis of an apparatus, b) scanning the first side surface and detecting the X, Y dimensions of the piece good resting on the support surface with a first optical reading device arranged below the turntable in the Z direction, and determining whether an identifier is detected during the scanning of the first side surface, c) scanning a second side surface facing a second reading device, which second side surface is designed orthogonally to the first side surface, and detecting a Z dimension of the piece good resting on the support surface with a second optical reading device, and if no identifier is detected on the first side surface, determining whether an identifier is detected during the scanning of the second side surface, d) rotating the turntable so that a next side surface, which is perpendicular to the first side surface, faces the second optical reading device, if no identifier is detected, wherein the next side surface is scanned with the second reading device, and determining whether an identifier is detected during the scanning of the next side surface, e) repeating step d) until one of three next side surfaces are scanned and an identifier is detected, f) removing the piece good from the turntable and sending the piece good for further use if no identifier was detected in step e), g) determining, by a control device when an identifier and all dimensions of the resting piece good are detected, a storage location in a storage area arranged downstream of the turntable based on one of the detected dimensions and the detected identifier; and, h) gripping the piece good with a gripping device of a second conveying device after determining the storage location and moved to the storage location, whereby the gripping device is moveable in any of the X, Y and Z directions.

One or more embodiments provide a method for identifying, measuring and positioning piece goods. The method includes arranging, with a first conveying device, a single piece good on a first side surface on a support surface of an optically transparent turntable rotatable about an axis of rotation extending orthogonally to the support surface, the support surface corresponding to a longitudinal axis and a transverse axis of an apparatus; scanning the first side surface and detecting longitudinal and transverse dimensions of the piece good resting on the support surface with a first optical reading device arranged below the turntable; determining whether an identifier is detected during the scanning of the first side surface; scanning a second side surface facing a second optical reading device, the second side surface orthogonal to the first side surface; detecting a height dimension of the piece good resting on the support surface with the second optical reading device; determining whether an identifier is detected during the scanning of the second side surface; rotating the turntable so that a next side surface perpendicular to the first side surface faces the second optical reading device, if no identifier is detected, wherein the next side surface is scanned with the second reading device; determining whether an identifier is detected during the scanning of the next side surface; repeating the preceding two steps until one of three next side surfaces are scanned and an identifier is detected; removing the piece good from the turntable and sending the piece good for further use if no identifier is detected; determining, by a control device, when an identifier and all dimensions of the resting piece good are detected, a storage location in a storage area arranged downstream of the turntable based on one of the detected dimensions and the detected identifier; and, gripping the piece good with a gripping device of a second conveying device after determining the storage location and moving the piece good to the storage location, whereby the gripping device is moveable in any of longitudinal, transverse and orthogonal directions.

The foregoing and other features, aspects and advantages of the disclosed embodiments will become more apparent from the following detailed description and accompanying drawings.

BRIEF DESCRIPTION OF THE DRAWINGS

The device according to the present disclosure and the method according to the present disclosure are described in greater detail below, with reference to the appended drawings.

FIG. 1b is a side view of the apparatus of FIG. 1a.

FIG. 4 is a top plan view of the apparatus of FIG. 1a.

DETAILED DESCRIPTION

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

For typical apparatuses and corresponding methods, piece goods, such as pharmaceutical packages, which are thereby provided disordered and in large numbers, are isolated, identified and made available for automatic storage. A disadvantage of the known apparatuses and methods is that they have a relatively low throughput, which is not sufficient for large piece good volumes and accordingly large piece good storage. Another disadvantage of known apparatuses and methods is that separated piece goods can thereby only be fed sequentially into storage, which is one reason for the low throughput.

It is an object of the present disclosure to provide an apparatus and a method for identifying, measuring and positioning piece goods, in which the processing speed and flexibility are increased.

An apparatus for identifying, measuring and positioning piece goods, in particular pharmaceuticals, includes an optically transparent turntable with a support surface for piece goods, which support surface extends in an X and Y direction of the apparatus, wherein this turntable cooperates with a rotary drive coupled to a control device and is rotatable about an axis of rotation extending in a Z direction, wherein the Z direction extends orthogonally to the X and Y directions and wherein the X direction corresponds to the longitudinal axis and the Y direction corresponds to the transverse axis of the device. The apparatus further includes a first conveying device for arranging a piece good on the support surface of the turntable and a first optical reading device for detecting the X, Y dimensions of the piece good resting on the support surface, wherein the reading device is arranged in the Z direction below the turntable and is coupled to the control device, and an identifier on one side surface of the resting piece good faces the support surface.

By way of example, the first optical reading device may be a camera which produces an image of the side surface facing the support surface, which is optionally forwarded to the control device which examines the image obtained with regard to the X, Y dimensions and the presence of an identifier. In one or more aspects, the reading device itself can perform the aforementioned analysis of the image and forward the results to the control device. With the help of the identifier, it can be clearly determined which pharmaceutical was arranged in which dispensing form on the turntable. The identifier may be, for example, a barcode. In one or more aspects, a laser can be used as an optical reading device which scans a side surface.

The apparatus may include a second optical reading device, which is likewise coupled to the control device, for detecting the Z dimension (i.e. the height) of the piece good resting on the support surface and an identifier on a side surface orthogonal to the support surface. This second optical reading device can also be a camera, for example, which operates as already described above. Downstream of the turntable is provided a storage area for a plurality of piece goods, wherein the arrangement of the turntable and the storage area to each other defines the longitudinal axis of the apparatus.

The storage area may be provided by a variety of facilities. For example, by a conveying device belt of a storage facility. The storage area is then not a fixed portion of the conveying device belt, but is always provided by the portion or the support surface of the conveying device belt, which is located in a predetermined portion, which can be accessed by the second conveying device. In one or more aspects, a slidable storage tray may provide the storage area or, in the simplest case, an immovable storage table.

The apparatus may include a second conveying device coupled to the control device having a gripping device for piece goods, wherein the gripping device is movable in the storage area, at least in the X and Y directions, such that piece goods can be arranged side by side in the storage area in the X and/or Y directions.

The apparatus according to the disclosure includes the use of two conveying devices, wherein the first is adapted to receive a piece good from an arbitrarily designed supply device and to feed it to the turntable, on which the identification of the piece good takes place, and whereas the second conveying device is provided to pick up the piece goods after identification and measurement and to arrange it in the storage area. According to the disclosure, the second conveying device is designed in such a way that it can be moved in both the X and Y directions over the storage area such that the piece good gripped by the second conveying device can be arranged at any position of the storage area.

According to the disclosure, the storage area is dimensioned so that a plurality of piece goods of "usual" size can be arranged side by side in the X and/or Y directions of the apparatus. This makes it possible to pick up a plurality of piece goods in the storage area or from the storage area during a gripping process by a gripper of a picking apparatus which does not belong to the apparatus according to the disclosure itself. This is not possible in the case of typical apparatuses, since the identified piece goods are always arranged successively at the same position due to the limitations of the known apparatuses, i.e., identified piece goods can only be gripped and stored sequentially, one after the other.

The throughput of the device according to the disclosure is on the one hand increased by the fact that two conveying devices are used, the one for arranging piece goods on the turntable, and the other for gripping piece goods from the turntable and arranging them in the storage area. Due to the design of the second conveying device, it is possible, in terms of storage, to arrange piece goods so that a plurality of piece goods can be gripped simultaneously, which in turn increases the throughput of the apparatus and the storage speed of the picking apparatus which is usually arranged downstream.

In the disclosed apparatus, a first optical reading device is arranged below the turntable and a second optical reading device is arranged laterally of the turntable. If, in the case of the piece goods resting on the turntable, the identifier is arranged on the turntable facing the "lower" side surface of the piece good or is arranged on one of the side surfaces designed orthogonally to the lower side surface of the piece good, an identification of the piece good is possible with the two aforementioned reading devices. Only in the event that only one identifier is arranged on the piece good, which identifier is arranged on the side surface facing away from the surface of the turntable due to the placement of the piece good, no identification is possible with the two reading devices, so that a repositioning of the piece good on the turntable is necessary. To avoid this, it is provided in one or more embodiments of the disclosure that the apparatus has a third optical reading device arranged in the Z direction above the turntable and coupled to the control device for detecting the dimensions of the piece good and/or of an identifier resting on a side surface facing away from the support surface.

In the apparatus according to the disclosure, the piece goods are arranged on the turntable with the first conveying device. How exactly the gripping of a piece good takes place is not substantial for the present disclosure. Regularly, however, the gripping of a piece good from a plurality of piece goods resting on a supply device takes place, wherein the conveying device does not always pick up a piece good at a preferred side surface (e.g., the largest side surface of the piece good), but at the side surface, which is most suitable for picking up the piece good. As a result, it is uncertain in which arrangement the piece good is gripped by the first conveying device. It may happen that a piece good is gripped, for example, at an end face or at a non-largest side surface of the piece good. The piece goods are therefore not always arranged with the same side surface on the turntable (e.g., not always with the largest side surface of the piece good), but depending on how they are picked up by the conveying device or its gripping device. Regularly, however, it is preferred that piece goods be stored resting on the largest side surface, for which it is necessary that the piece goods rest on exactly this largest side surface on the turntable.

In order to be able to achieve this, it is necessary to know the orientation of the piece good gripped or stored with the first conveying device. For this purpose, it is provided in one or more embodiments of the device according to the disclosure that this comprises an optical coarse detection device, such as a 2D or 3D camera, for determining the spatial orientation of a piece good. The spatial orientation can be determined for example after gripping a piece good. If, for example, it is ascertained during the determination of the spatial orientation that a piece good is deposited on a non-largest side surface, i.e. a non-largest side surface facing the support surface of the turntable, the piece good can be repositioned based on the knowledge of the spatial orientation of, for example, the first or second conveying device (e.g., by simply overturning directly after depositing) so that the piece good rests on its largest side surface.

Occasionally, it may happen that the identifier arranged on a side surface on a piece good, for example, is impaired by transport damage such that an identification of a piece good is not possible. In one or more embodiments, it is therefore provided that a discarding device for discharging piece goods is arranged between the turntable and the storage surface. This may be, for example, a flap which can be pivoted in the Z direction and which is opened for discharging a piece good if the identification is not possible.

The exact configuration of the first and/or second conveying device, in particular its gripping device, is not substantial for the present disclosure. In one or more embodiments of the present disclosure, however, it is provided that the first and/or the second conveying device is or are designed as suction grippers which are movable in the X, Y and/or Z direction. Due to the design as a suction gripper, in particular the picking up of piece goods from a plurality of piece goods is facilitated in the first conveying device since, in contrast to, for example, clamping grippers, a close juxtaposition of piece goods does not stand in the way of picking up a piece good. In particular, since the second conveying device or the gripping device of this conveying device is also movable in the Z direction, it is also possible to arrange piece goods on the support surface one above the other. This can be useful, for example, in the case of identical pharmaceutical packages, if experience has shown that they are very frequently and/or repeatedly to be outsourced.

The dimensions and weights of the piece goods to be handled with the apparatus can vary greatly, i.e. heavy small and large light piece goods can be present. In order to optimally adapt a suction gripper to the differently dimensioned and differently heavy piece goods, it is provided in one or more embodiments that a suction gripper has at least two differently dimensioned suction heads.

In one or more embodiments, it is provided that the second conveying device is designed as a clamping gripper which is movable at least in the X and Y directions. The use of a clamping gripper is particularly useful when it comes to relatively large and heavy piece goods, whose gripping with a suction gripper is problematic.

How exactly the piece goods of the first conveying device are provided is not substantial to the present disclosure. In one or more embodiments, however, provision is made for the apparatus to comprise a supply device and a position detection device arranged in the Z direction above the supply device. The position detection device is usually a 3D camera, with which the positioning of different piece goods in a plurality of piece goods can be detected. By the control device coupled to the position detection device, a next optimal gripping surface of a piece good can be determined, via which the piece good can be removed from the plurality of piece goods. In one or more embodiments according to the disclosure, it is possible, without the assistance of a user, to offer a plurality of piece goods by the supply device, which are then fully automatically isolated and identified, and arranged in the storage area for later storage.

A method according to the disclosure for identifying, measuring and positioning piece goods includes a) a single piece good is arranged on a first side surface on a support surface of an optically transparent turntable, which support surface extends in the X and Y directions, by a first conveying device, wherein the turntable cooperates with a rotary drive coupled to a control device and is rotatable about an axis of rotation extending in the Z direction, wherein the Z direction extends orthogonally to the X and Y directions and wherein the X direction corresponds to the longitudinal axis and the Y direction corresponds to the transverse axis of the apparatus. In step b) the first optical reading device arranged in the Z direction below the turntable scans the first side surface and it determines the X, Y dimensions of the piece good resting on the storage surface and determines whether an identifier was detected during the scanning of the first side surface. In step c) a second side surface, which is designed orthogonally to the first side surface, is scanned with a second optical reading device and the Z-dimension (i.e. the height) of the piece good resting on the support surface is detected. If no identifier was detected on the first side surface, it is determined whether an identifier was detected during the scanning of the second side surface, wherein the steps b) and c) can be performed simultaneously or staggered.

First of all, therefore, the "lower" side surface and a side surface of the piece good that is designed orthogonally to it, which may in particular be a pharmaceutical package, are measured and scanned with regard to an identifier. If no identifier can be determined at the lower first side surface and at the second side surface arranged orthogonally to the lower side surface, the turntable is rotated in a step d) such that a next side surface perpendicular to the first side surface faces the second optical reading device, wherein the second reading device scans the next side surface and determines whether an identifier was detected in the scanning of the next side surface. This step d) is repeated according to the disclosure until three next side surfaces are scanned or an identifier is detected. In the event that no identifier was detected, the piece good is removed from the turntable and fed to a further use in a method step e). As soon as an identifier and possibly all dimensions of the piece good resting thereon are determined, a storage location in a "storage area", which is arranged downstream of the turntable, is determined by a control device on the basis of the dimensions and/or optionally of the identifier. Such a determination is necessary because it should be possible by the method according to the disclosure to arrange piece goods in the storage area, such that several piece goods can be removed from this at the same time. How exactly the piece goods are arranged in the storage area, depends on the one hand on the dimensions of the piece good(s) already resting on the support surface and the removal direction of a gripper, with which a plurality of piece goods can be removed.

After determining the storage location of the piece good in the storage area said product is gripped by a gripping device of a second conveying device and moved to the storage location, for which purpose the gripping device is moved in the X and possibly Y and Z directions.

It is essential in the method according to the disclosure that the piece goods after identification by the second conveying device are not simply moved to a consistently same storage location, from which they are moved or gripped, but that by the controller a storage location is determined in the storage area, namely depending on the dimensions of the piece goods to be stored and the possibly already stored piece goods and the removal direction. It can thereby be achieved that a plurality of piece goods is arranged side by side in such a way that they can be gripped simultaneously with a gripper. How exactly the arrangement of the piece goods has to be made depends on how the gripper accesses the piece goods, for example, whether the gripper is moved along the X or Y direction into the space above the storage surface.

In order to ensure that even in the event that the piece good has only one identifier, a repositioning of the piece good to recognize the identifier is not necessary, it is provided in one or more embodiments that in method step b) a third optical reading device arranged in the Z-direction above the turntable scans a side surface of the piece good, which rests on the turntable, which side surface faces this reading device side, wherein the X, Y dimensions of the piece good resting on the support surface are possibly determined wherein it is determined whether an identifier was detected during the scanning of the side surface.

Before the removal of the piece good, in order to recognize in which orientation the piece good is gripped, it is provided in one or more embodiments of the inventive method that the spatial orientation of the piece good held by the first conveying device is determined in step a) before arranging the piece good on the support surface of the turntable by a coarse detection device. Once the spatial orientation is determined, the controller may already begin to determine the optimal storage location in the storage area.

If a coarse detection device is used, it is provided in one or more embodiments of the method that the coarse detection device is designed as an optical reading device and the piece good is scanned during the determination of the spatial orientation in order to detect an identifier. Depending on the orientation of the identifier, it may happen that an identifier can already be scanned with the coarse detection device. This saves time for the subsequent method steps, so the method can be accelerated.

Often, it is desired that piece goods be stored resting on the largest side surface. However, since it is not ensured when gripping the piece goods by the first conveying device, that the piece goods are gripped by the first conveying device so that they can be placed on a largest side surface on the turntable, it is provided in one or more embodiments that if it is detected during the determination of the spatial orientation that the largest side surface of piece good held by the conveying device is not facing a the support surface, that the piece good is moved after being arranged on the support surface by a conveying device so that the piece good rests on a largest side surface on the support surface.

Figure 1A:
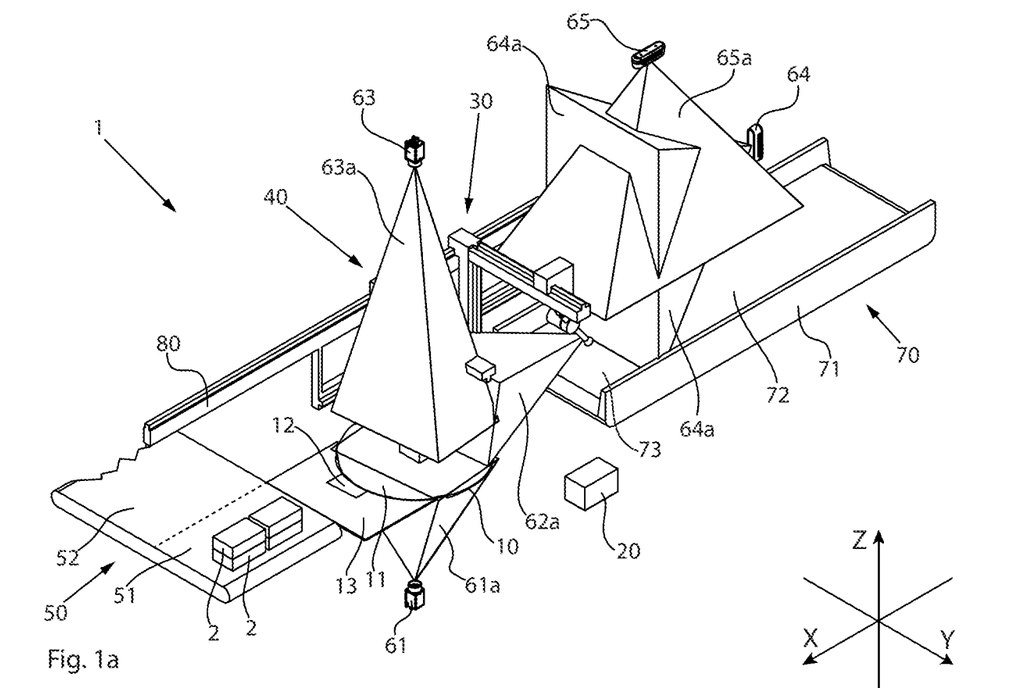
FIG. 1a is a perspective view of an apparatus for identifying, measuring and positioning piece goods with schematically indicated detection areas of reading and detecting devices.
Figure 1B:
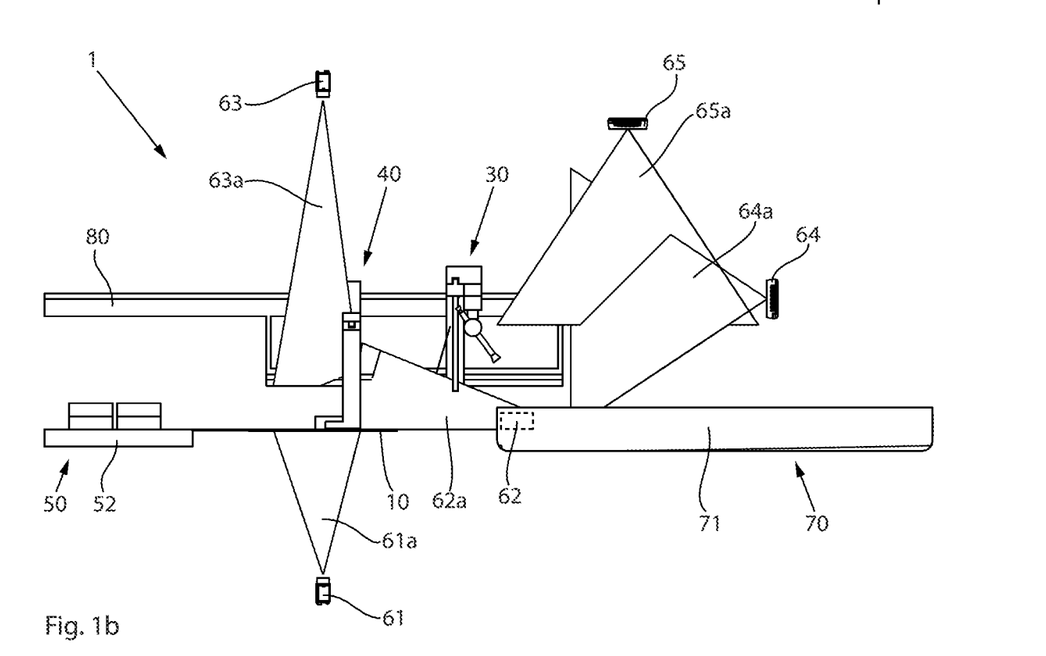

FIGS. 1a and 1b show an oblique view and a side view of an apparatus 1 for identifying, measuring and positioning piece goods 2. The apparatus 1 includes a central optically transparent turntable 10 with a support surface 11. This support surface extends in the X and Y directions, wherein the X direction corresponds to the longitudinal axis of the apparatus. The optically transparent turntable 10 cooperates with a rotary drive 12, via which the turntable is rotatable about an axis of rotation extending in the Z-direction, wherein the Z-direction extends orthogonally to a plane spanned by the X and Y directions. The rotary drive is arranged at a discarding device 13, which has a round recess at an end face facing the turntable 10, which is adapted to the diameter of the turntable such that only a narrow gap is designed between the discarding device 13 and the turntable 10, over which piece goods 2 can be easily pushed if necessary. Below the turntable 10, a first optical reading device 61 is arranged and a detection range 61a of the reading device 61 is indicated schematically.

A piece good 2 resting on the turntable 10 is scanned by the first optical reading device 61 in order to determine its X and Y dimensions. Furthermore, an attempt is made to read an identifier which is possibly attached on the side surface of the piece goods 2 facing the turntable in order to use this identifier to determine the exact kind of pharmaceutical and packing. The first reading device 61 is coupled to a control device 20 via lines which are not shown. The determination of the X and Y dimensions and the attempt to detect the identifier are carried out either by the reading device 61 itself or by the control device 20, with the aid of image processing software, for example. Whether the determination of the dimensions and of the identifier is performed by the reading device 61 itself or the control device 20 depends on the exact configuration of the reading device 61. If this is designed by a simple 3D camera, the actual determination of the dimensions and of the identifier is carried out by image processing software running in the control device 20.

On the side of the turntable 10 and in a range of a supply device 70, a second optical reading device 62 is arranged with a detection area 62a, which reading device 62 is provided for detecting the Z dimension (e.g., the height of the piece good 2) and for scanning an identifier on a side surface of the piece good 2 which side surface extends orthogonally to the storage surface of the turntable 10.

The aforementioned supply device 70 comprises a conveying device belt 72 and side walls 71. The supply device 70 supplies piece goods 2 in the X direction, i.e. from upstream of the turntable 10 with respect to the X direction. The supply device 70 includes a buffer zone 73 downstream of the conveying device belt 72, in which the movement of delivered piece goods 2 is stopped and which can take up piece goods 2 that may slip when gripping a piece good 2 from a plurality of piece goods 2. In the buffer zone 73 the second optical reading device 62 is also arranged.

A third optical reading device 63 having a detection area 63a is arranged in the Z direction above the turntable 10, wherein the third optical reading device 63 is provided for detecting an identifier on a side surface of the piece good 2 facing away from the turntable 10. If this has not already been done with the first optical reading device 61, the X and Y dimension of the overlaid piece good 2 can optionally also be determined via the third optical reading device 63. Also, the third optical reading device 63 is connected via lines (again not shown) with the control device 20 and may be designed according to the first reading device 61 and operated accordingly, i.e. the determination of the dimensions or the identifier can be performed by the reading device 61, 63 itself or by the control device 20.

Downstream of the turntable 10 a storage device 50 is provided, which includes a conveying device belt 52, wherein a portion of this conveying device belt 52 provides a storage area 51 on which piece goods 2 can be stored after identification. Thus, due to the use of a conveying device belt 52, the storage area 51 is not always provided by the same section but it is provided by different sections of the conveying device belt 52 depending on the movement of the conveying device belt 52. The orientation of the storage device 50 may be varied. Here, this is designed in the Y direction, wherein stored piece goods 2 can be moved by the conveying device belt 52 before they are taken by a gripper (not shown) from the conveying device belt 52. As another example, the storage device 50 may include a movable conveying device plate, by which stored piece goods 2 are moved. As yet another example, the storage device 50 may include a non-movable conveying device table, which provides the storage area 51.

The conveying device further comprises a guide 80 extending in the X direction, on which a first conveying device 30 and a second conveying device 40 are guided, both of which are coupled to the control device 20 with lines (not shown), and which are described in more detail with reference to the figures below.

Above the supply device 70, a position detection device 65 is arranged with a detection area 65a, wherein the position detection device 65 is connected to the control device 20 via lines (not shown). By the position detection device 65, piece goods 2 resting on the conveying device belt 72 are analyzed and it is determined which piece good 2 is picked up next from the plurality of piece goods 2 with the first conveying device 30. The position detection device 65 may be designed, for example, as a 3D camera, which forwards the captured images to the control device 20, where it may be determined by image processing software, which piece good 2 will be taken next.

The piece goods 2 provided by the supply device 70 are usually arranged chaotically and disorderly on the conveying device belt 72. The piece goods 2 are thus disordered on the supply device 70, i.e. the orientation of the different piece goods 2 differs, so that a piece good 2 can rest, for example, on a largest side surface on the supply device 70, whilst another can rest on a narrow side surface. How a piece good 2 is gripped by the first conveying device 30 is often not detectable with the position detection device 65, i.e. the orientation of the gripped piece good 2 is not known because the control device 20 cannot determine the other dimensions only from the dimensions of the side surface of a piece good 2 facing the control device 20.

In order to determine the orientation of a piece good 2, which was gripped by the supply device 70 with the first conveying device 30, the apparatus 1 includes a coarse detection device 64 with a detection area 64a, which detection device 64 is also arranged above the supply device 70 and laterally to the first conveying device 30. With the coarse detection device 64, the Z and Y dimension of the received piece goods 2 can be determined. Based on the X-dimension already known by the position detection device 65, the orientation of the gripped piece good 2 can be determined, so that they may possibly still be varied in preparation of the arrangement on the turntable 10 or after being stored. For example, if it is determined that the largest side surfaces of the gripped piece good 2 extend in the Z direction, the piece good 2 can be overturned after being arranged on the turntable 10 with the first or the second conveying device 30, 40, so that the piece good 2 rests with a largest side surface on the turntable 10.

Figure 2:
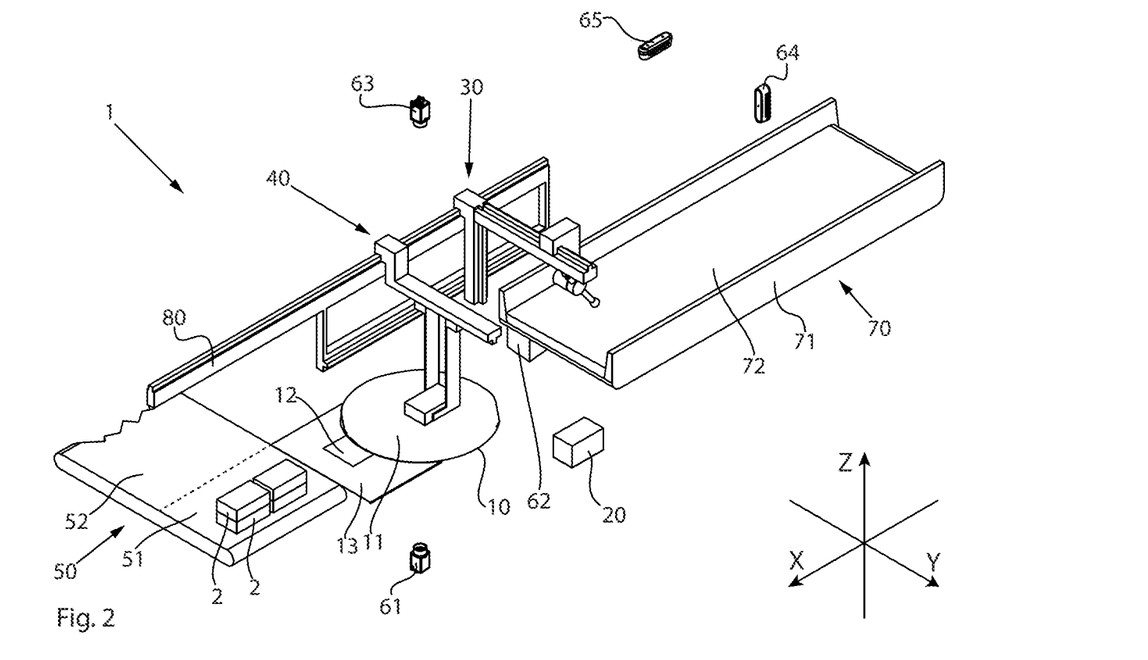
FIG. 2 is a perspective view of the apparatus of FIG. 1a without the detection areas.
Figure 3:
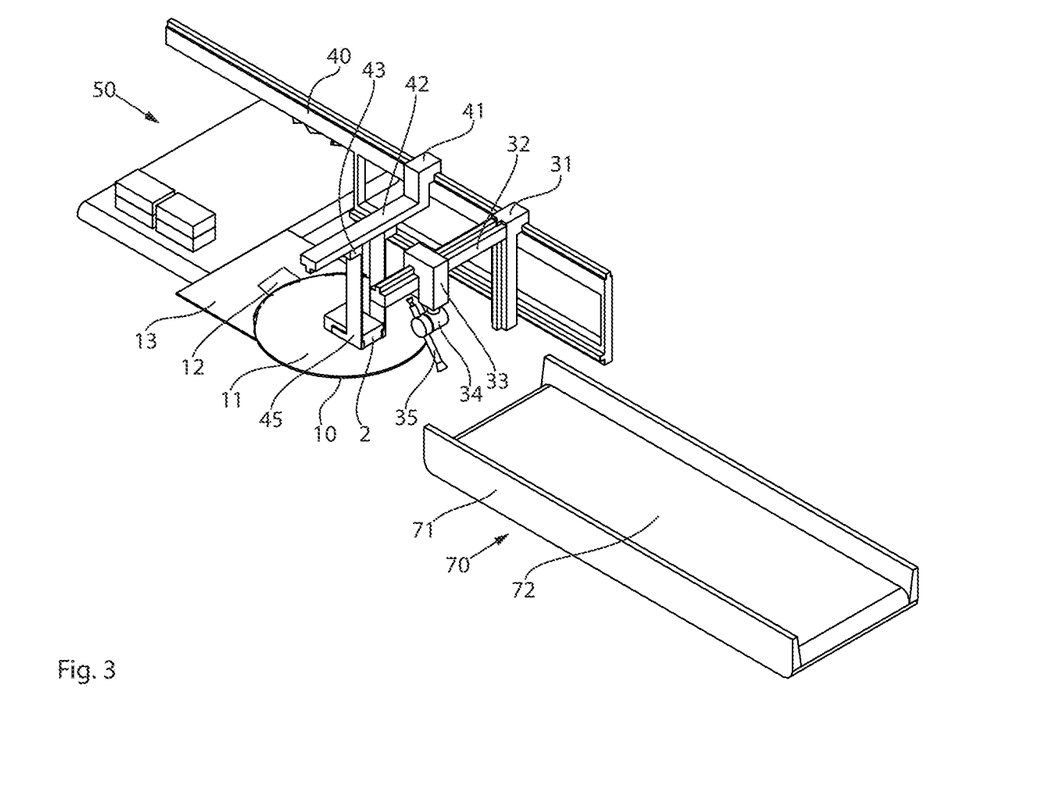
FIG. 3 is a perspective view of the apparatus of FIG. 1a without detection areas and reading and detecting devices.

In FIG. 2, the detection areas of the optical reading devices 61, 62, 63 are omitted, so that the remaining components of the apparatus 1 are more visible. In FIG. 3, the optical reader devices 61, 62, 63, the coarse detection device 64 and the position detection device 65 are also omitted so that the first and second conveying devices 30, 40 can be accurately seen, which will be described in more detail below.

The first conveying device 30 comprises an X carriage 31 which is movable in the X direction on the guide 80. The X carriage comprises a Z guide on which a Y guide 32 is movable in the Z direction. On the Y guide 32 in turn a holder 33 is arranged movably in the Y direction, the holder 33 having a rotary bearing 34 at its lower end face facing the turntable 10 on which a gripper 35 is arranged, which is configured here as a suction pad with a double suction head, which is described in more detail with reference to FIG. 12.

The second conveying device 40 also comprises an X carriage 41 which is movable in the X direction on the guide 80. Furthermore, the second conveying device 40 comprises a Y guide 42, which is designed integrally with the X carriage 41 that therefore is not movable on the X carriage 41 in the Z direction, as it is the case with the first conveying device 30. Two brackets 43 are arranged on the Y guide 42 of the second conveying device 40, which are movable in the Y direction, i.e. away from each other and toward each other. At each holder 43, a gripper 45 is arranged, wherein the gripper 45 is designed as clamping jaws in the second conveying device 40. As shown in FIGS. 2 and 3, a piece good 2 is held between the clamping jaws 45 and can be moved with the second conveying device 40 via the discarding device 13 to the storage area 51 arranged downstream of the turntable 10. Upstream of the turntable 10, the supply device 70 is arranged to provide a plurality of piece goods (not shown).

Figure 4:
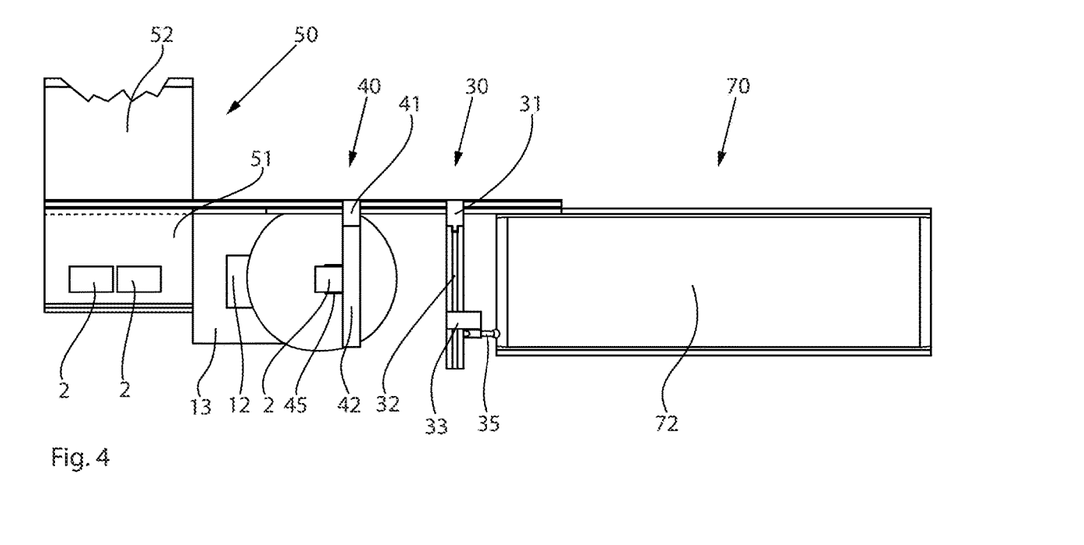

FIG. 4 shows apparatus 1, wherein the reading devices and the detection devices are omitted. In the top view, it can be seen in particular that the supply device 70 is arranged upstream of the optically transparent rotary plate 10 and the storage device 50 is arranged downstream of this turntable 10. By way of the supply device 70, piece goods (not shown), in particular pharmaceutical packages, are provided, which are then transferred from the first conveying device 30 to the turntable 10, from where they are moved into the storage area 51 of the storage device 50 by the second conveying device 40.

Figure 5:
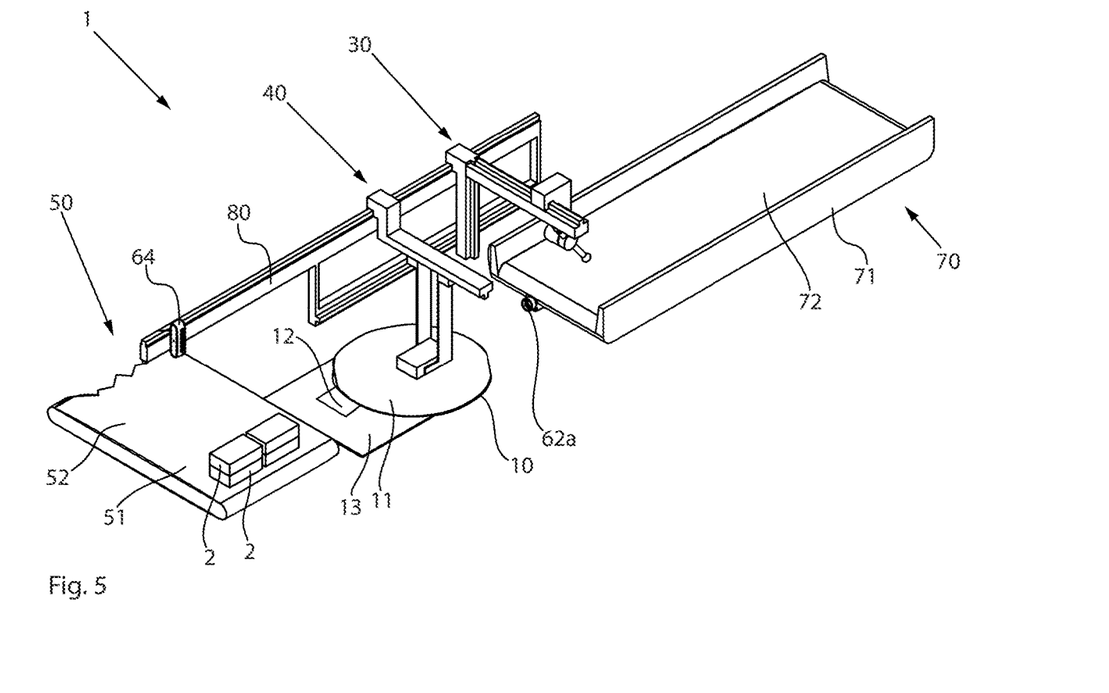
FIG. 5 is a perspective view of an apparatus for identifying, measuring and positioning piece goods.

FIG. 5 shows an example apparatus 1 for identifying, measuring and positioning piece goods 2. Here, the second detection device 62 is arranged slightly differently, namely below the supply device 70, which also comprises no buffer zone. The coarse detection device 64 is arranged differently also, on the guide 80 of the apparatus 1, namely in the vicinity of the turntable 10.

Figure 6A:
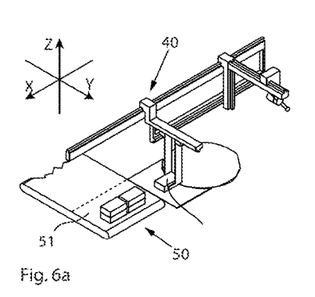
FIGS. 6a-6c are schematic illustrations of various stages of a method identifying, measuring and positioning piece goods.
Figure 6B:
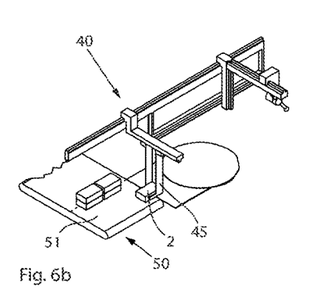
Figure 6C:
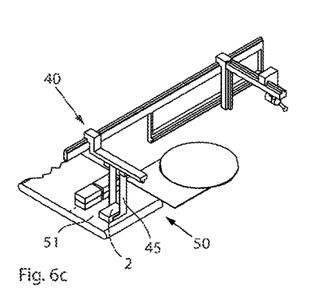

FIGS. 6a-6c show different positions of the second conveying device 40 in a method for identifying, measuring and positioning piece goods and are intended to illustrate how a piece good 2 can be moved into the storage area 51. In FIG. 6a, four piece goods 2 are arranged in the storage area 51, wherein two identically dimensioned piece goods 2 are arranged one above the other and the two stacks of piece goods 2 are arranged one behind the other in the X direction. The storage device 50 includes a conveying device belt 52, by which piece goods arranged in the storage area 51 are movable in the Y direction. In FIG. 6b, the two stacks of piece goods 2 are already moved to the "left" so that the storage area 51 is free for receiving further piece goods 2. With the second conveying device 40, another piece good 2, held by the clamping jaws 45, is already moved slightly towards the storage area 51 in the X direction. Due to the mobility of the second conveying device 40 in the X direction, it is possible to arrange with this a plurality of piece goods 2, inter alia, in the X direction one behind the other in the storage area 51. FIG. 6c shows the final position of the piece good 2 which is still held in the depositing area 51 by the clamping jaws 45. The clamping jaws 45 are also movable in the Z direction, so that a stacking of piece goods 2 is possible, which is not illustrated in the FIGS. 6a-6c.

Figure 7:
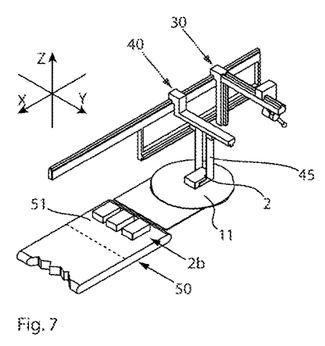
FIGS. 7-9 are schematic illustrations of the method of FIGS. 6a-6c, in which the piece goods are each arranged differently in the storage area.
Figure 8:
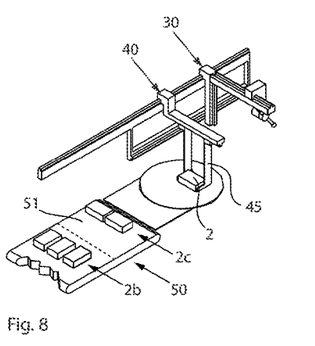
Figure 9:
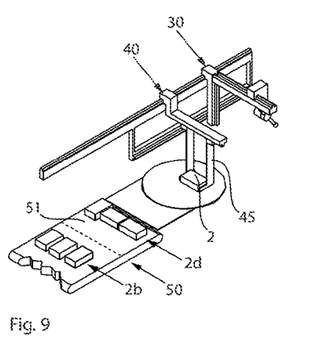

FIGS. 7-9 show an example apparatus 1 for identifying, measuring and positioning piece goods 2 as well as different process guides with regard to the arrangement of piece goods 2 in the storage area 51. In all of FIGS. 7-9, the storage device 50 does not extend in the Y direction, but in the X direction. Here, the storage device 50 again includes a conveying device belt 52, which provides the storage area 51 for arranging piece goods. In FIG. 7, three piece goods 2 are arranged side by side in the Y direction in a piece good row 2b, wherein the longitudinal axis of the piece goods 2 is aligned with the longitudinal axis of the storage device 50. The piece goods 2 shown in FIG. 8 are arranged rotated by 90°, i.e. the longitudinal axis of the piece goods 2 of the piece good row 2c is aligned with the Y direction. Regardless of the orientation of the piece goods 2 in the storage area 51, the two piece good rows 2b and 2c can be taken from the conveying device belt 52 by, for example, a clamping gripper (not shown), for which purpose the clamping gripper is moved in the Y direction over the conveying device belt 52. The piece good rows 2b, 2c can be removed directly in the storage area 51, but it is also possible to first move the piece good row 2b, 2c from the storage area 51 before removal by the clamping gripper, as shown in FIGS. 7-9.

FIG. 9 shows an arrangement of piece goods 2 in a piece good row 2d, wherein the piece goods 2 are arranged differently such that a piece good 2 is aligned with the longitudinal axis in the X direction and two piece goods 2 aligned with the longitudinal axis in the Y direction. Since the control device (not shown) knows the removal direction of the piece good 2 from the storage device 50, it is possible for the control device to arrange the piece goods 2 on the storage surface 51 so that a removal of a piece good row 2d is possible even with differently arranged or differently wide piece goods 2. When using a clamping gripper, for example, it is necessary in such a case that the widest piece good 2, which is gripped with the clamping jaws, is arranged on the "back" with respect to an orientation direction in the Y direction, so that it can be gripped by the tips of the clamping jaws such that the piece goods 2 which are resting in front thereof, are moved when being removed, for example, from the conveying device belt 52.

Figure 10:
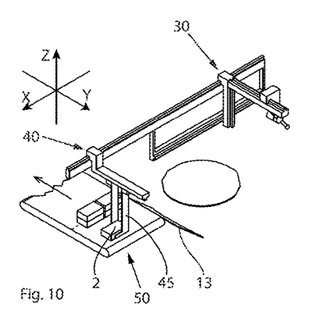
FIG. 10 is a perspective view of an apparatus for identifying, measuring and positioning piece goods.

FIG. 10 shows the apparatus 1, wherein the discarding device 13 is pivoted away downwardly at it face facing the turntable 10, so that piece goods 2 can be discarded through the opening, for example, in the case of a non-recognition of an identifier.

Figure 11:
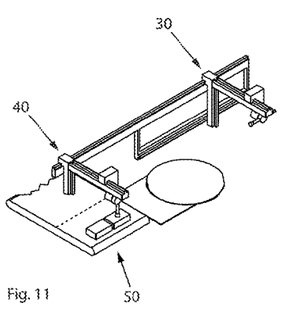
FIG. 11 is a perspective view of an apparatus for identifying, measuring and positioning piece goods.

FIG. 11 shows an example apparatus 1, wherein both the first conveying device 30 and the second conveying device 40 are designed as suction grippers.

Figure 12:
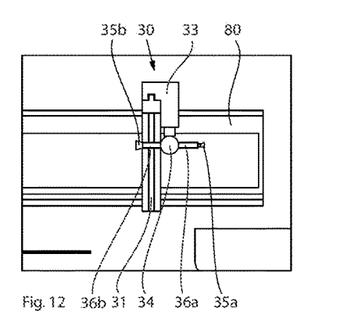
FIG. 12 is a side view of a conveying device of the apparatus of FIG. 11.

FIG. 12 shows a detailed view of the first conveying device 30 designed as a suction gripper. As can be seen in FIG. 12, the suction gripper in the rotary bearing 34 comprises two suction tubes 36a, 36b on opposite sides, at the ends of which a suction head 35a, 35b is respectively arranged. The diameters of the suction heads 35a, 35b are dimensioned differently, so that they can be adapted to different dimensions of piece goods 2 to be gripped. If, for example, a piece good 2 is to be gripped on a very narrow side surface, the suction head 35a is used. If a wider or larger side surface is to be gripped, the suction head 35b is used.

Figure 13A:
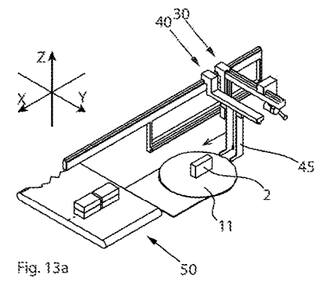
FIGS. 13a-13c are schematic illustrations of various stages of a method identifying, measuring and positioning piece goods.
Figure 13B:
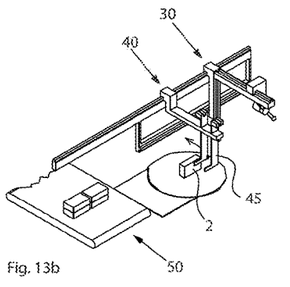
Figure 13C:
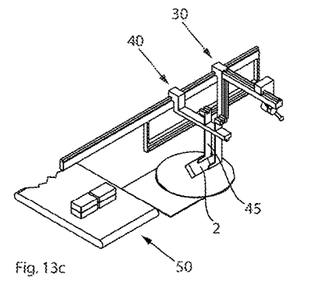

FIGS. 13a-13c show a portion of a method for identifying, measuring and positioning piece goods. Here, after gripping a piece good 2 with the first conveying device 30 by a coarse detection device 64 (not shown in FIGS. 13a-13c), the orientation of the piece good 2 is determined. As can be seen from FIG. 13a, the piece good 2 was picked up and deposited on the turntable 10 in such a way that the two largest side surfaces extend perpendicularly to the support surface 11 of the turntable 10. Since it is regularly preferred to store the piece goods 2 on a largest side surface, the piece good 2 shown is overturned with the help of the second conveying device 40 (see FIG. 13b), so that it rests on a large side surface on the turntable 10 prior to storage. The scanning of the side surfaces, in order to recognize the identifier and the dimensions, may be made before or after the overturning.

Figure 14:
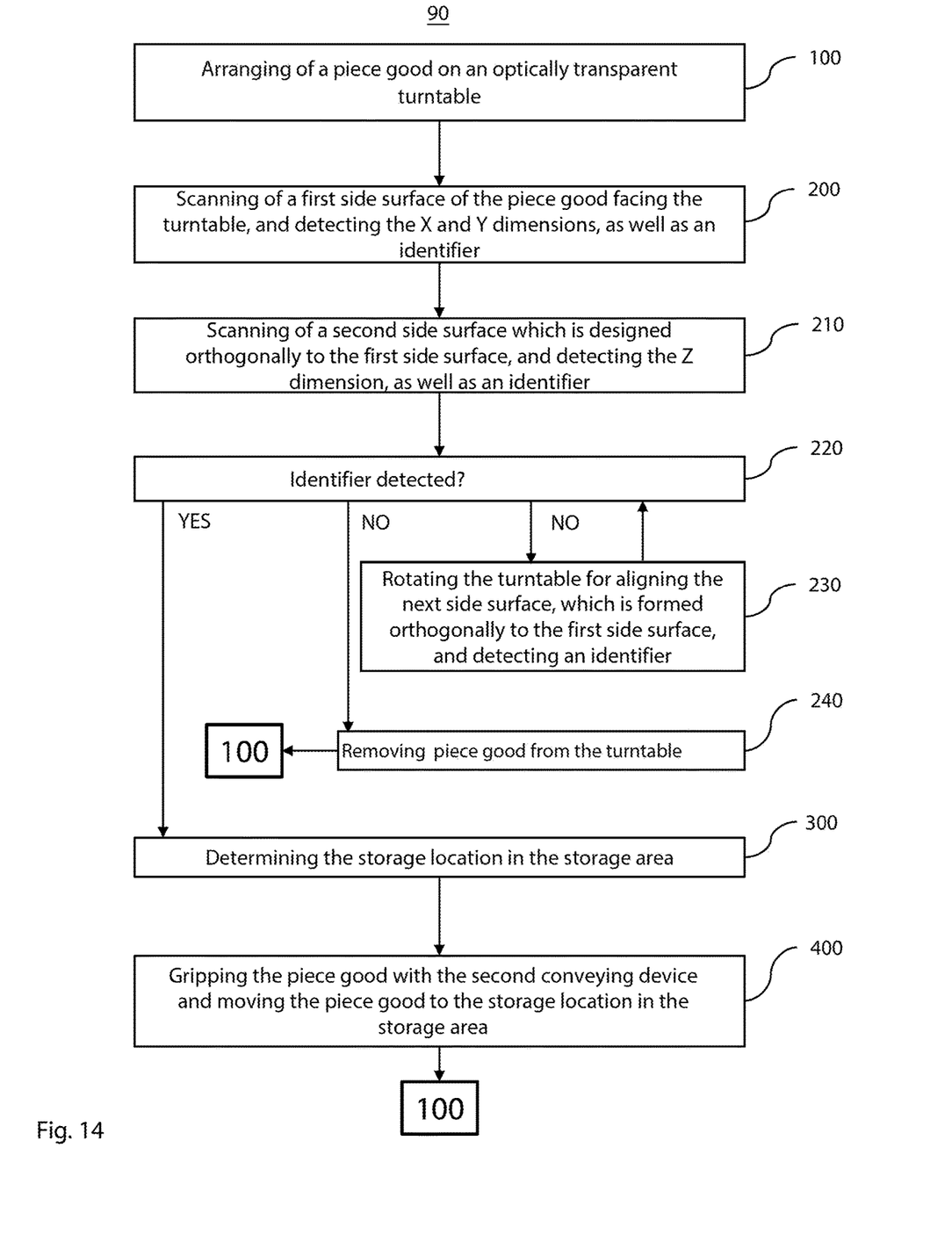
FIG. 14 is a flow chart of a method identifying, measuring and positioning piece goods.

FIG. 14 shows a flow diagram of a method 90 for identifying, measuring and positioning piece goods. In a first step 100, a piece good 2 is arranged on the optically transparent turntable 10. For this purpose, a piece good 2 is gripped with the first conveying device 30 and arranged on a first side surface on the support surface 11 which extends in the X and Y directions. In a step 200, the first side surface facing the turntable 10 of the piece good 2 is scanned with a first optical detection device 61 for determining the X, Y dimensions and an identifier. On the basis of the data obtained, which are usually data from a 3D camera, the X and Y dimensions and, if applicable, the identifier, if one has been applied and recognized on this side surface, are determined. This can be done with the first optical reading device 61 itself or with a control device 20. In a step 210, a second side surface designed orthogonally to the first side surface is scanned with the second optical reading device 62 for determining the Z dimension and an identifier. Based on the data obtained, as already described above, the Z dimension of the piece good 2 is determined. Unless an identifier could be recognized on the first side surface, an attempt is also made to determine an identifier based on the data obtained.

In a subsequent step 220, it is then determined whether an identifier was determined at step 200 or 210. If this is not the case, in a step 230, the turntable 10 is rotated so that the second optical reading device 62 faces a next orthogonal side wall. The next side surface is scanned and analyzed for an identifier. Thereafter, the process is repeated from step 220 until either an identifier is detected, or all four orthogonal side surfaces are scanned. If no identifier was detected, the piece good is removed from the turntable 10 in a step 240 and returned to step 100. If an identifier was detected, the control device 20 determines a storage location in the storage area 51 in a step 300. This is possible because the control device 20 knows the occupancy of the storage area 51 and the nature and dimensions of the piece good 2.

After determining the storage area 51, the piece good 2 resting on the turntable 10 is gripped with the second conveying device 40 in a step 400 and moved to the storage location in the storage area 51. For this purpose, the second conveying device 40 is moved in the X direction and Y direction into the storage area 51. After storing the piece good 2, the method is continued at step 100 until the storage area 51 is filled. The piece goods 2 are then removed from the storage area 51, for example, by a clamping gripper of a control unit not belonging to the device of a picking apparatus or by moving the storage surface that provides the storage area 51 so that the piece goods 2 are removed from the storage area 51.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

The invention claimed is:

1. An apparatus for identifying, measuring and positioning piece goods, comprising:
    an optically transparent turntable having a support surface for piece goods extending in an X and Y direction of the apparatus, wherein the turntable cooperates with a rotary drive coupled to a control device and is rotatable about an axis of rotation extending in a Z direction extending orthogonally to the X and Y directions, and wherein the X direction corresponds to a longitudinal axis and the Y direction corresponds to a transverse axis of the apparatus;
    a first conveying device for arranging a piece good on the support surface of the turntable and comprising a first gripping device that is movable in the X, Y and Z directions, the first gripping device comprising:
        a rotary bearing;
        first and second suction tubes coupled to opposing sides of the rotary bearing; and
        first and second suction heads coupled to the first and second suction tubes, respectively, the first and second suction heads having different diameters;
    a first optical reading device arranged in the Z direction below the turntable and coupled to the control device for detecting dimensions of a piece good resting on the support surface and an identifier on one side surface of a resting piece good, which side surface faces the support surface;
    a second optical reading device coupled to the control device for detecting a height of a piece good resting on the support surface and an identifier on a side surface of a resting piece good which side surface is orthogonal to the support surface;
    a storage area arranged downstream of the turntable for a plurality of packaged goods, wherein the arrangement of the turntable and of the storage area defines the longitudinal axis; and
    a second conveying device coupled to the control device and having a second gripping device for piece goods, wherein the second gripping device is movable, at least in the X and Y directions, over the storage area, so that piece goods can be arranged side by side in the storage area in any of the X and Y directions.

2. The apparatus of claim 1, further comprising:
    a third optical reading device arranged in the Z direction above the turntable and coupled to the control device, the third optical reading device configured to detect dimensions of the piece good resting on the support surface.

3. The apparatus of claim 1, further comprising:
    a third optical reading device arranged in the Z direction above the turntable and coupled to the control device, the third optical reading device configured to detect an identifier on one side surface facing away from the support surface.

4. The apparatus of claim 1, further comprising:
    an optical coarse detection device coupled to the control device and configured to determine a spatial orientation of a piece good.

5. The apparatus of claim 1, further comprising:
    a discarding device arranged between the turntable and a storage surface, the discarding device configured to remove piece goods.

6. The apparatus of claim 1, wherein the first conveying device comprises a suction pad that is movable in the X, Y and Z directions.

7. The apparatus of claim 6, wherein the suction pad comprises two differently dimensioned suction heads.

8. The apparatus of claim 1, wherein the second conveying device comprises suction pads that are movable in the X, Y and Z directions.

9. The apparatus of claim 8, wherein the suction pad comprises two differently dimensioned suction heads.

10. The apparatus of claim 1, wherein the second conveying device comprises a clamping gripper that is movable at least in the X and Y directions.

11. The apparatus of claim 1, further comprising:
    a supply device; and
    a position detection device arranged above the supply device in the Z direction.

12. A method for identifying, measuring and positioning piece goods, the method comprising:
    a) arranging, with one of a first suction head and a second suction head of a first conveying device comprising a rotary bearing, first and second suction tubes coupled to opposing sides of the rotary bearing, the first and second suction heads having different diameters and being coupled to the first and second suction tubes respectively, a single piece good on a first side surface on a support surface of an optically transparent turntable, the support surface extending in an X and Y direction, wherein the turntable cooperates with a rotary drive coupled to a control device, and which turntable is rotatable about an axis of rotation extending in a Z direction extending orthogonally to the X and Y directions, and wherein the X direction corresponds to a longitudinal axis and the Y direction corresponds to a transverse axis of an apparatus;

b) scanning the first side surface and detecting the X, Y dimensions of the piece good resting on the support surface with a first optical reading device arranged below the turntable in the Z direction, and determining whether an identifier is detected during the scanning of the first side surface;

c) scanning a second side surface facing a second reading device, which second side surface is designed orthogonally to the first side surface, and detecting a Z dimension of the piece good resting on the support surface with a second optical reading device, and if no identifier is detected on the first side surface, determining whether an identifier is detected during the scanning of the second side surface;

d) rotating the turntable so that a next side surface, which is perpendicular to the first side surface, faces the second optical reading device, if no identifier is detected, wherein the next side surface is scanned with the second reading device, and determining whether an identifier is detected during the scanning of the next side surface;

e) repeating step d) until one of three next side surfaces are scanned and an identifier is detected;

f) removing the piece good from the turntable and sending the piece good for further use if no identifier was detected in step e);

g) determining, by a control device when an identifier and all dimensions of the resting piece good are detected, a storage location in a storage area arranged downstream of the turntable based on one of the detected dimensions and the detected identifier; and, h) gripping the piece good with a gripping device of a second conveying device after determining the storage location and moved to the storage location, whereby the gripping device is moveable in any of the X, Y and Z directions.

13. The method of claim 12, wherein steps b) and c) are carried out simultaneously.

14. The method of claim 12, wherein steps b) and c) are staggered.

15. The method of claim 12, wherein step b) further comprises:
scanning a side surface by a third optical reading device arranged above the turntable in the Z direction, said side surface facing the third optical reading device; and
determining whether an identifier is detected during the scanning of the side surface.

16. The method of claim 15, wherein step b) further comprises:
detecting the X, Y dimensions of the piece goods resting on the support surface.

17. The method of claim 12, wherein step a) further comprises:
determining, by a coarse detection device, a spatial orientation of the piece good held by a first conveying device before arranging the piece goods on the support surface of the turntable.

18. The method of claim 17, wherein the coarse detection device comprises an optical reading device and, when determining the spatial orientation, the piece good is scanned in order to detect an identifier.

19. The method of claim 17, further comprising:
moving the piece good by a conveying device such that the piece good rests on a largest side surface on the support surface if it is detected during the determination of the spatial orientation that not a largest side surface of the piece good held by the conveying device is facing the support surface.

20. A method for identifying, measuring and positioning piece goods, the method comprising:
arranging, with one of a first suction head and a second suction head of a first conveying device comprising a rotary bearing, first and second suction tubes coupled to opposing sides of the rotary bearing, the first and second suction heads having different diameters and being coupled to the first and second suction tubes respectively, a single piece good on a first side surface on a support surface of an optically transparent turntable rotatable about an axis of rotation extending orthogonally to the support surface, the support surface corresponding to a longitudinal axis and a transverse axis of an apparatus;
scanning the first side surface and detecting longitudinal and transverse dimensions of the piece good resting on the support surface with a first optical reading device arranged below the turntable;
determining whether an identifier is detected during the scanning of the first side surface;
scanning a second side surface facing a second optical reading device, the second side surface orthogonal to the first side surface;
detecting a height dimension of the piece good resting on the support surface with the second optical reading device;
determining whether an identifier is detected during the scanning of the second side surface;
rotating the turntable so that a next side surface perpendicular to the first side surface faces the second optical reading device, if no identifier is detected, wherein the next side surface is scanned with the second reading device;
determining whether an identifier is detected during the scanning of the next side surface;
repeating the preceding two steps until one of three next side surfaces are scanned and an identifier is detected;
removing the piece good from the turntable and sending the piece good for further use if no identifier is detected;
determining, by a control device, when an identifier and all dimensions of the resting piece good are detected, a storage location in a storage area arranged downstream of the turntable based on one of the detected dimensions and the detected identifier; and,
gripping the piece good with a gripping device of a second conveying device after determining the storage location and moving the piece good to the storage location, whereby the gripping device is moveable in any of longitudinal, transverse and orthogonal directions.

* * * * *